United States Patent [19]
Boegehold

[11] 3,811,575
[45] May 21, 1974

[54] SYSTEM OF CONSTRUCTING DISPLAY RACKING AND SHELVING

[76] Inventor: Richard A. Boegehold, 5 Greenview Way, Upper Montclair, N.J. 07043

[22] Filed: Apr. 5, 1972

[21] Appl. No.: 241,333

[52] U.S. Cl............... 211/148, 211/176, 211/182, 248/245, 403/187, 403/297
[51] Int. Cl. ............................................ A47f 5/10
[58] Field of Search .......... 211/148, 176, 177, 182; 287/54 C, 54 A, 126, 111, 189.36 H;DIG. 8; 248/245; 312/257 R

[56] References Cited
UNITED STATES PATENTS

| | | | |
|---|---|---|---|
| 2,888,112 | 5/1959 | Keller.................... | 287/189.36 C |
| 3,188,037 | 6/1965 | Hinrichs.................. | 211/182 X |
| 3,250,584 | 5/1966 | Tassell.................... | 248/245 X |
| 3,437,362 | 4/1969 | Offenbroich............. | 287/127 R X |
| 3,456,966 | 7/1969 | Muller.................... | 287/189.36 H |
| 3,537,736 | 11/1970 | Kroopp................... | 287/54 C |
| 3,574,367 | 4/1971 | Jankowski............... | 287/54 C |

FOREIGN PATENTS OR APPLICATIONS

| | | | |
|---|---|---|---|
| 1,909,056 | 10/1969 | Germany................. | 287/189.36 H |
| 688,166 | 3/1965 | Italy........................ | 211/176 |
| 443,595 | 2/1968 | Switzerland............. | 211/176 |

*Primary Examiner*—Ramon S. Britts
*Attorney, Agent, or Firm*—Pennie & Edmonds

[57] ABSTRACT

A system for joining two members wherein one member includes opposing wall surfaces defining a track and the other member includes a pair of plates disposed in overlying relation to each other and a control mechanism for moving the plates apart and into frictional contact with the wall surfaces to secure the second member to the first member.

15 Claims, 20 Drawing Figures

3,811,575
FIG. 1
FIG. 2
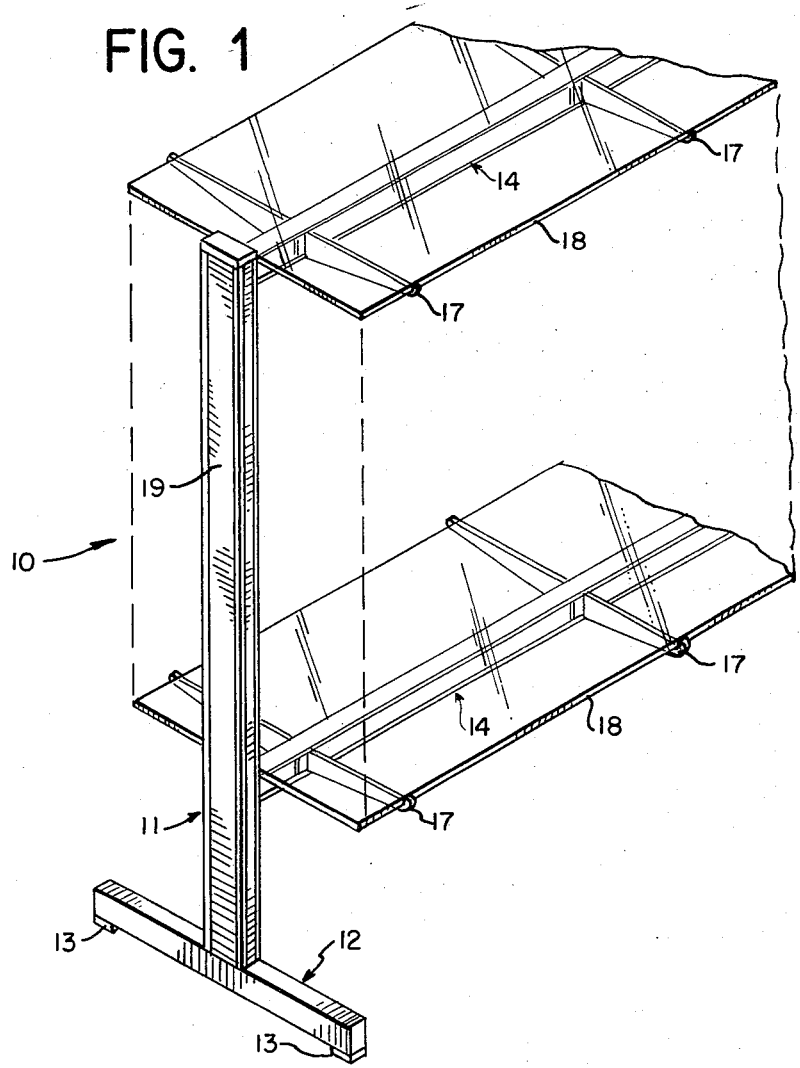
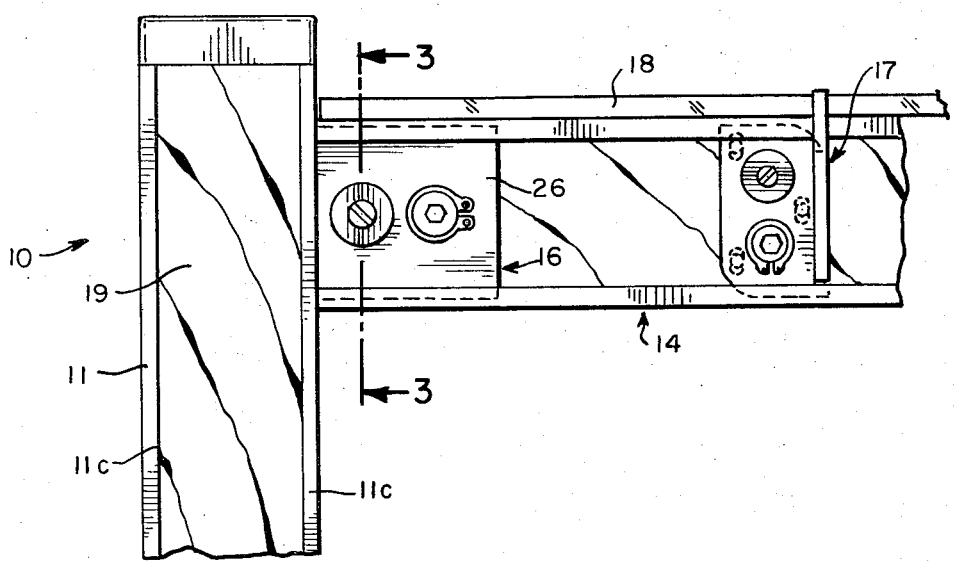

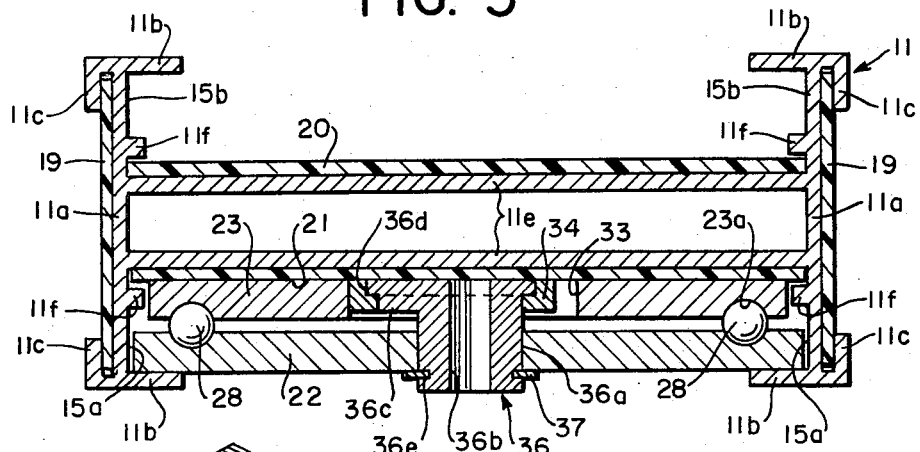
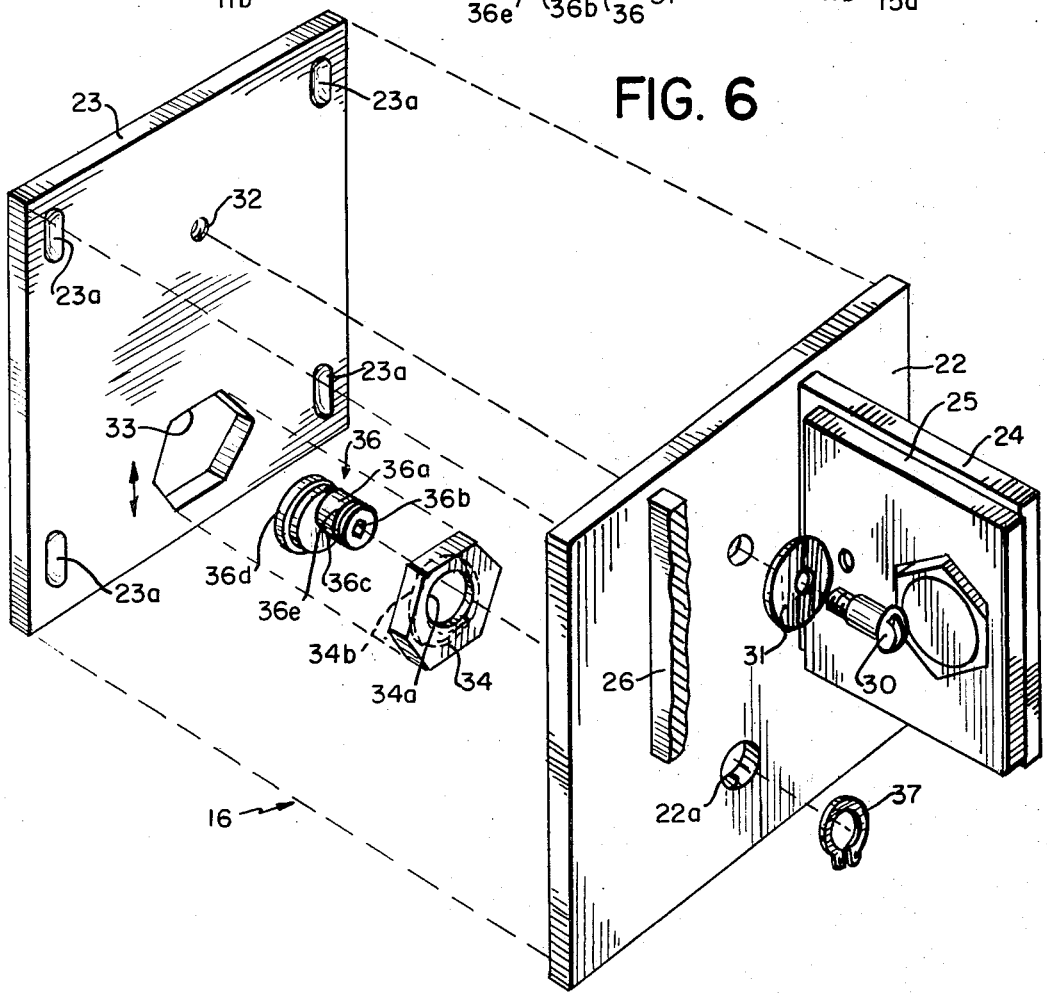

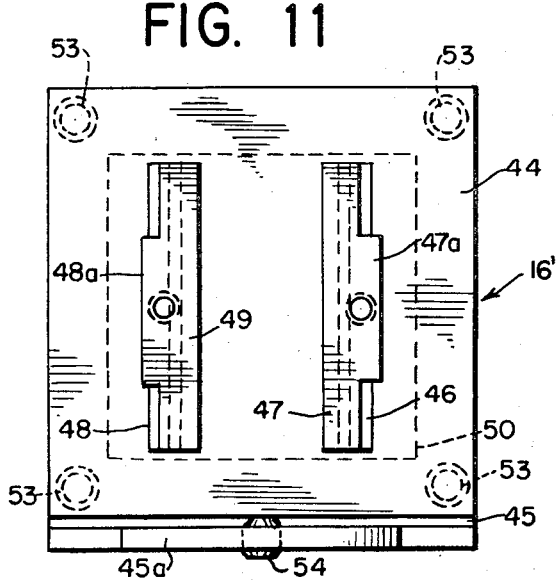
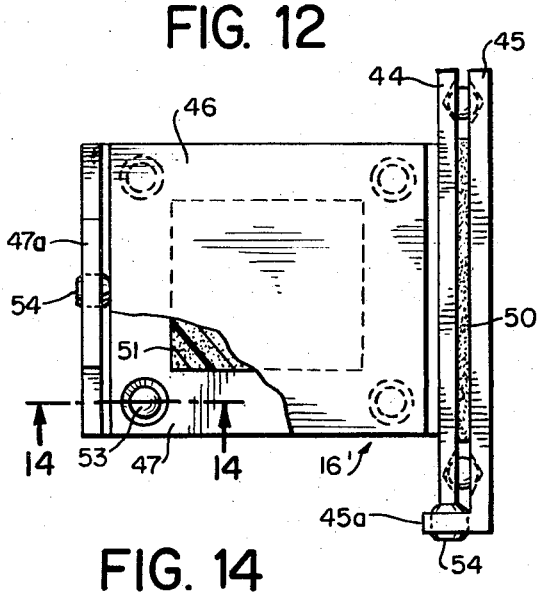
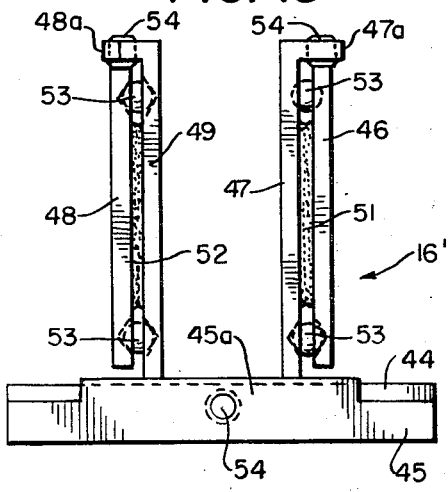
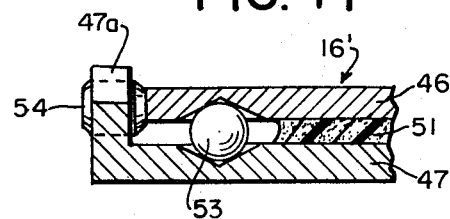
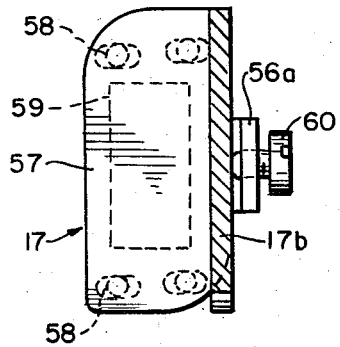
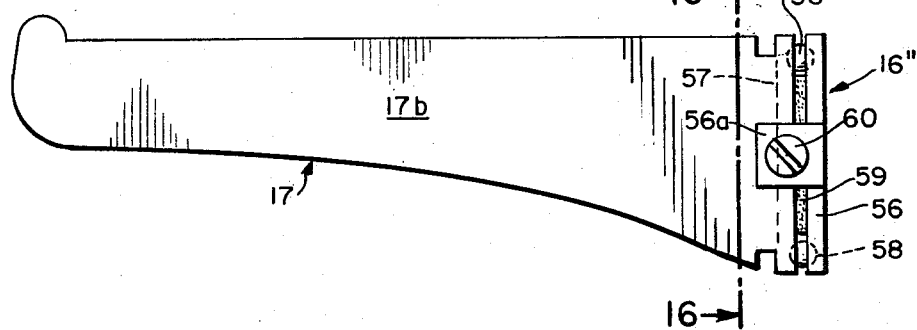

3,811,575

SYSTEM OF CONSTRUCTING DISPLAY RACKING AND SHELVING

BACKGROUND OF THE INVENTION

The present invention relates to the construction of racks which are freestanding or supported by a wall or a ceiling, and involves unique means for securing together upright and generally horizontal support members in the form of hollow extruded beams. A particular end use envisaged for the present invention is in the construction of display racks for retail store merchandise. Heretofore, such racks have provided for the interconnection of horizontal shelf-bearing members and vertical support members at different height increments; that is to say, the shelf supporting members might be varried in height only within limitations dictated by the manufacturer. One disadvantage inherent in such a rack construction system is that the system is relatively inflexible and may not suit the needs of individual users. Another disadvantage is that incrementally adjustable joint connections may fail due to the inherent weaknesses of design; or, may require disassembling of the rack in order to adjust the load bearing members into different positions.

It is the purpose of the present invention to obviate the foregoing difficulties and to provide a system for interconnecting rigid, load bearing members which has a wide range of adaptability in an architectural sense. The principle of the present invention may, therefore, serve in the construction of furniture frames, store fronts, railings etc. in addition to the construction of display racking and shelving previously mentioned.

SUMMARY OF THE INVENTION

The present invention provides in its broadest sense a system for interconnecting two elements, one of which may be a structural member and the other of which is a connector for joining the structural member to an adjacent structural member. The structual member includes opposing, uniformly spaced wall surfaces which define at least one receiving recess while the connector includes at least two plates in close, overlying parallel relation, the plates being slidably received within the recess in the structural member, and means are provided for separating the plates while maintaining their parallel overlying relation to bring edge portions of the plates to bear against adjacent wall surfaces of the track. The frictional engagement between connector plates and the track is sufficient to establish a rigid connection. In its more specific aspects, the present invention provides a system for joining two elongated members, one of which defines a track for the reception of pairs of plates comprising base and support legs of a connector. The base leg of the connector is slidably received in one of the elongated members at any position along the track therein, while the support leg is slidably received in a recess adjacent to the connecting end of the other of elongated members. In a particular embodiment, the first of the elongated members may comprise an upright end support and the second a horizontal, load bearing member suitable to mount shelving.

In accordance with further aspects of the invention, various means have been disclosed for separating the overlying plates of each leg of the connector, such means being employed as well to secure a knife bracket in position for mounting shelving.

BRIEF DESCRIPTION OF THE DRAWING

FIG. 1 is a partial view in perspective of a display rack incorporating interconnecting members in accordance with the present invention;

FIG. 2 is an enlarged fragmentary side elevational view of a portion of the rack of FIG. 1 showing the interconnection of an upright end support with a shelf bearing support member;

FIGS. 4 and 5 are horizontal sections taken in the direction of arrows 4—4 and 5—5 respectively of FIG. 3;

FIG. 6 is an exploded view showing various parts of a connecting member used in the embodiment of FIGS. 1–5;

FIGS. 11–13 are front, side and bottom views respectively of an alternate form of connector in accordance with the present invention;

FIG. 14 is a fragmentary cross section taken in the direction of arrows 14—14 of FIG. 12;

FIG. 15 is a side view of a knife bracket and connector;

FIG. 16 is an end view of the knife bracket connector of FIG. 15 along the line 16—16 of FIG. 15;

DESCRIPTION OF PREFERRED EMBODIMENT

Figure 3:
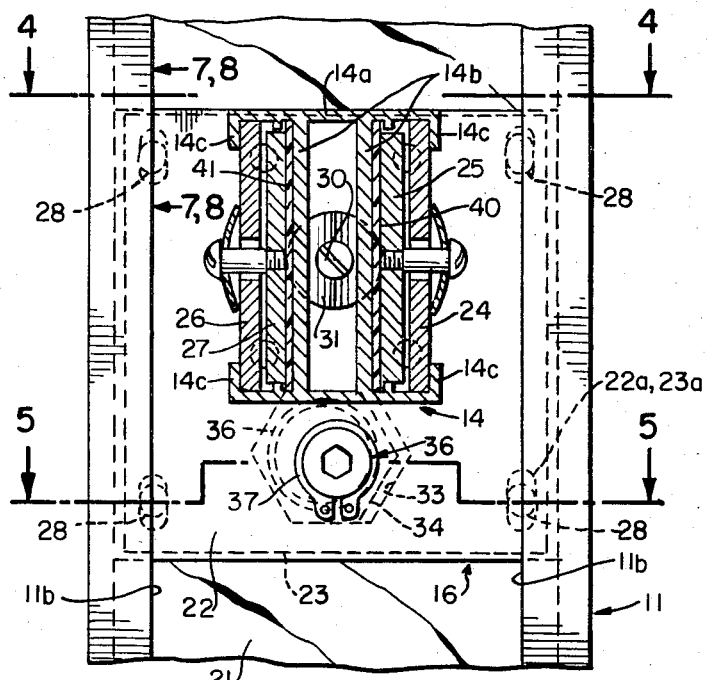
FIG. 3 is a vertical section taken in the direction of arrows 3—3 of FIG. 2.

Referring to the drawing and initially to FIG. 1 thereof, a display rack 10 of the "I" type which incorporates features of the present invention has been illustrated. The rack 10 includes upright end support members 11 mounted upon foot brackets 12 which rest upon floor glide members 13. Horizontal shelf supporting members 14 are secured at their ends to the upright member 11 in a manner which will be described in connection with a novel connector 16 (FIGS. 2–6). Each of the horizontal support members 14 mounts a series of knife brackets 17 which support glass shelving 18 as shown. The connectors 16 illustrated herein shall be described in detail as they may be used to secure horizontal members 14 to upright member 11. However, it should be understood that connectors of similar construction may be used to secure upright members 11 to foot brackets 12.

Figure 4:
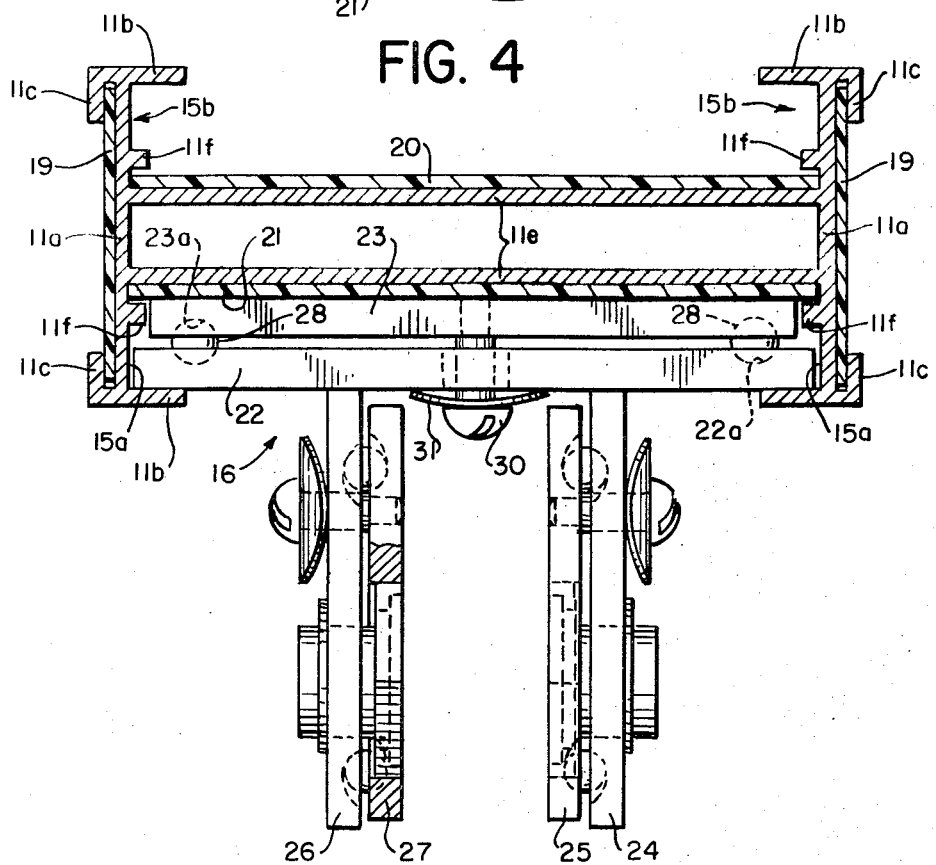

Referring to FIG. 4, it will be seen that each upright member 11 includes webs 11a each terminating in flanges 11b and 11c. Between opposed flanges 11c and webs 11a is a narrow rectangular groove adapted to receive a decorative strip of formica 19. At its center, the upright member 11 is a box beam construction having parallel transverse webs 11e. Short flanges 11f project parallel to webs 11e toward each other and together with webs 11e define narrow rectangular grooves for the reception of formica strips 20 and 21. Strips 19–21 are provided for decorative effect. It is expected that connectors 16 will be faced with formica for a similar decorative effect; however, as shown herein, the connectors are without formica facings for simplicity of illustration and description.

Web sections 11b and transverse web 11e together define inwardly disposed relatively wide grooves or tracks 15a, 15b. Track 15a receives a base leg of a connector 16 comprising parallel juxtaposed base plates 22 and 23. Support plates 24 and 26 are welded to plate 22. The construction and mechanical relationship between the respective pairs of plates 22 and 23, 24 and 25, and 26 and 27 is essentially the same and consequently, the mechanical interaction with the structural members which they interconnect shall be described primarily with respect to the pair of base plates 22 and 23. By way of preliminary explanation, base plates 22 and 23 may be positioned lengthwise at any height within the tracks 15a, 15b. Support plates 24 and 25, 26 and 27 are received within tracks in the ends of members 14, the arrangement thus rendering member 14 slidable to any height position with respect to upright member 11.

Referring to FIGS. 5 and 6, it will be seen that plates 22 and 23 are separated by four steel balls 28 located in elongated facing grooves 22a and 23a in plates 22 and 23 adjacent to each of the four corners thereof. Plates 22 and 23 are maintained in their assembled position by means of a screw 30 which passes through spring washer 31 and plate 22 to be threadably received in tapped hole 32 in plate 23. Spring washer 31, as will be seen, is of sufficient resilience to permit the variable separation of plates 22 and 23 in the manner taught by the invention.

Plate 23 defines a hexagonally shaped opening 33 whose lateral maximum dimension is greater than its longitudianl dimension, the latter direction having been indicated by arrows which appear in FIG. 6. The hexagonal opening 33 receives a uniformly dimensioned hexagonal member 34 which snugly fits the opening 34 in the longitudinal sense but may slide laterally therein for a distance provided by a clearance 33a. A cranking member 36 includes a shaft 36a having an opening 36b for the reception of an Allen wrench. Two circular sections 36c and 36d are integrally connected on one end of shaft 36a, whose axes are parallel with the axis of shaft 36a but eccentrically disposed for a predetermined distance with respect thereto. Sections 36c and 36d fit precisely into circular openings 34a and 34b in the hexagonal member 34. Shaft 36a extends through the circular opening 22a in plate 22 to be secured thereto by means of a retaining ring 37 which snaps into a groove 36e in the shaft 36a. When shaft 36a is rotated, sections 36c and 36d which are eccentric with respect to the axis of shaft 36a will cause hexagonal member 34 to be displaced for the distance represented by the eccentricity. When eccentric sections 36c and 36d move in a lateral or transverse sense, member 34 slides laterally within the opening 33 without moving plate 23 due to clearance 33a, which is great enough to accomodate the eccentric distance between the axes of sections 36c and 36d and the axis of shaft 36a. However, when the cranking member 36 is rotated so as to cause eccentric sections 36c and 36d to move longitudinally as indicated by the direction of the arrows shown in FIG. 6, such movement will cause the member 34 to displace plates 22 and 23 longitudinally. It should be noted that providing hexagonal member 34 as the slidable thrust member within opening 33, very little wear will occur between the sides of opening 33 and the actuating mechanism. Such wear would be far greater if section 36c were to act directly upon the sides of opening 33.

Figure 7:
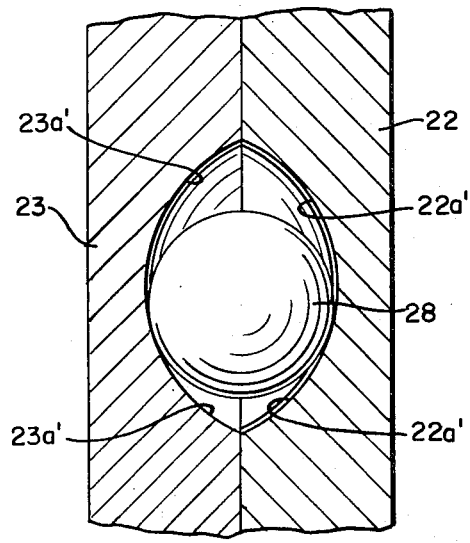
FIGS. 7 and 8 are cross sections taken in the direction of arrows 7,8–7,8 of FIG. 3.
Figure 8:
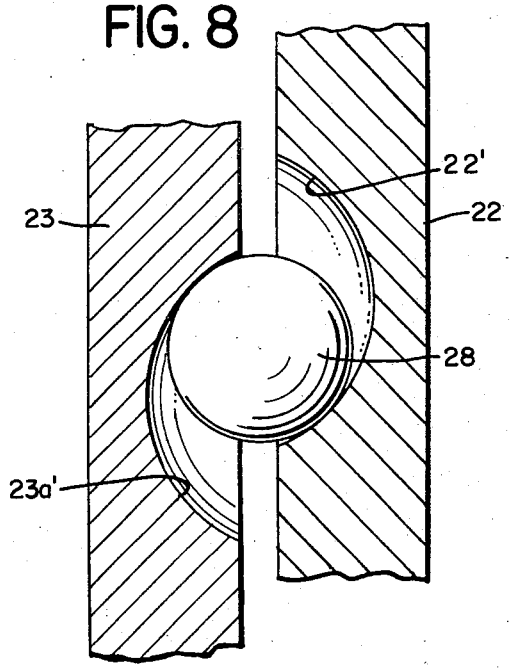
Figure 9:
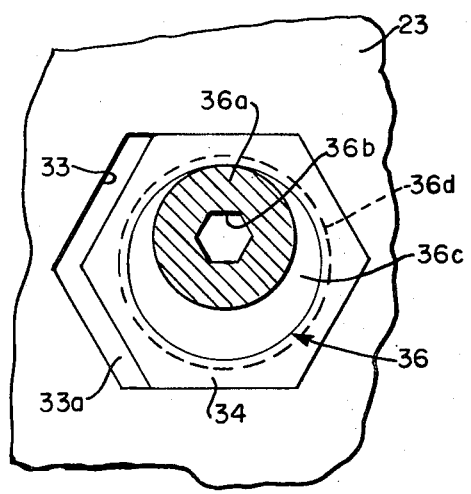
FIGS. 9 and 10 are fragmentary illustrations showing the movement of different internal parts of the connector of FIGS. 5 and 6 which cuase a clamping action to occur.

FIGS. 7–10 illustrate the result of the above-described longitudinal movement of plates 22 and 23. FIG. 7 shows balls 28 captured in grooves 22a and 23a within plates 22 and 23. Each groove is arcuate in form having inclined ends 22a' and 23a' which gradually lead to a center of maximum depth. Each ball 28 is free to roll within a groove and is of sufficient diameter to maintain contact at all times with the surfaces of opposing grooves. When the eccentric sections 36c and 36d are in the lower quadrant as shown in FIG. 9, hexagonal member 34 is to the right in opening 33 with clearance 33a appearing at the left. During initial rotation clockwise of shaft 36a, lateral movement of member 34 will take place and no corresponding lateral movement of plates 22 and 23 will occur due to the clearance 33a. When, however, the shaft 36a has been rotated 90° clockwise to the position shown in FIG. 10, member 34 will thrust in the direction of the arrow upon plate 23 to cause relative longitudinal displacement of plates 22 and 23 into the position of FIG. 8. During such displacement, balls 28 will roll upon the opposed inclined end surfaces 22a' and 23a' and thus plates 22 and 23 will move apart in a direction perpendicular to their opposing faces. The net effect of such plate movement will be to force plates 22 and 23 into close contact against adjacent flanges 11b of the upright member 11 and against formica strip 21 backed by web 11e so as to frictionally bear against those internal adjacent portions of member 11 which define the track 15a. This clamping pressure is so distributed over a wide area that it will not harm the formica strip. As shown in FIGS. 4 and 5, outwardly facing surfaces 22b of plate 22 may be roughened or serrated to increase the frictional resistance when bearing against flange 11b. This technique may, of course, be used with respect to plate 23.

Figure 10:
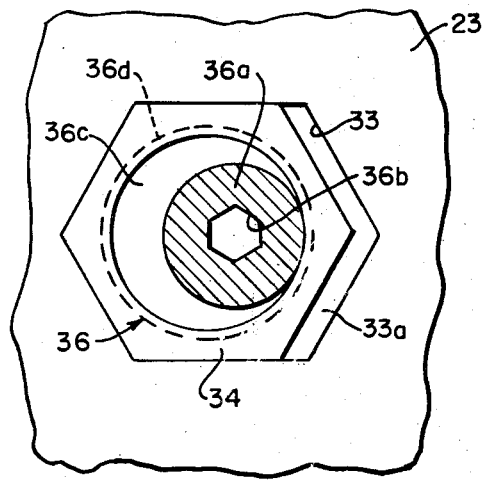

When the parts have assumed their position of FIGS. 8 and 10, they will remain in such position because of the balance between the frictional forces involved. It may seem, from FIG. 8, that balls 28 will roll back into the center of grooves 22a and 23a and that plates 22 and 23 would be returned to the position of FIG. 7; however, such movement will not occur of itself due to the fact that the frictional forces between eccentric sections 36c and 36d in member 34 and between upper and lower sides of opening 33 in the plate 23 cumulatively exceed the forces tending to center the balls 28 in their respective grooves.

Having described the clamping action of base plates 22 and 23 within the track 15a provided in upright member 11, it should be clear with respect to FIG. 3, that a similar clamping action will occur between pairs of support plates 24 and 25, and 26 and 27 which are within tracks provided in horizontal support member 14. Support member 14 is generally of the same cross sectional construction as is member 11 (though dimensionally smaller) having ends 14a interconnected by transverse webs 14b. The ends 14a are U-shaped, each having legs 14c which together with the webs 14b define tracks for the reception of pairs of clamping plates 24 and 25, 26 and 27. Formica strips 40, 41 are held within the tracks and the pairs of plates can exert their considerable clamping force against the formica without harm since the clamping pressure is distributed over a wide area. In actual practice, it has been found that when a connector has been clamped into position, the base plates 22 and 23 of the connector will not slide within the track in an upright member 11 if the application of weight upon horizontal member 14 is within the normal design limits of members 11 and 14.

Referring now to FIGS. 11–14, there has been illustrated an alternate form of connector 16' in accordance with the principles of the present invention. The connector 16' includes base plates 44 and 45. Plate 44 mounts pairs of support plates 46 and 47, and 48 and 49. In each case, the juxtaposed pairs of plates 44–49 are held together by means of resilient rubber strips 50, 51 and 52. Steel balls 53 are located at each corner between the plates of respective pairs within grooves formed in such plates. In the embodiment of FIGS. 11–14, one plate of each pair has connected thereto a flange, for example, flanges 45a, 47a and 48a, each of which threadably receives a set screw 54. Set screws 54 bear upon the edges of adjacent plates 44, 46 and 48 and when turned so as to move against such plates, will cause the balls 53 to separate the respective plates in a manner similar to the connector embodiment of FIGS. 1–6.

FIGS. 15 and 16 illustrate the use of a similar connecting principle in combination with a knife bracket 17. Each knife bracket comprises an arm 17b of conventional design which is secured at one end to a connector 16". The connector 16" has two opposing plates 56 and 57 separated by steel balls 58 resiliently held by the intervening rubber strip 59. Plate 56 has a flange 56a mounting a threaded screw 60. The screw 60 when turned clockwise will force the plates to be separated in the same manner as with the embodiment of FIGS. 11–14. It will be noted that plates 56 and 57 have rounded corners which permit the plates to be fitted into a track in a horizontal member 14 by simply rotating the knife bracket 90° in a counter-clockwise direction.

Figure 17:
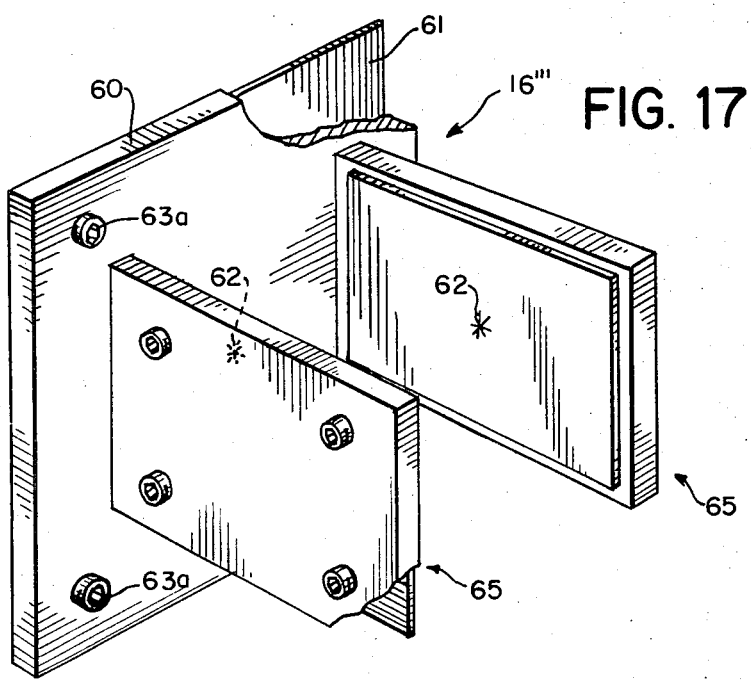
FIG. 17 is a perspective view of an alternate form of connector in accordance with the present invention.
Figure 18:
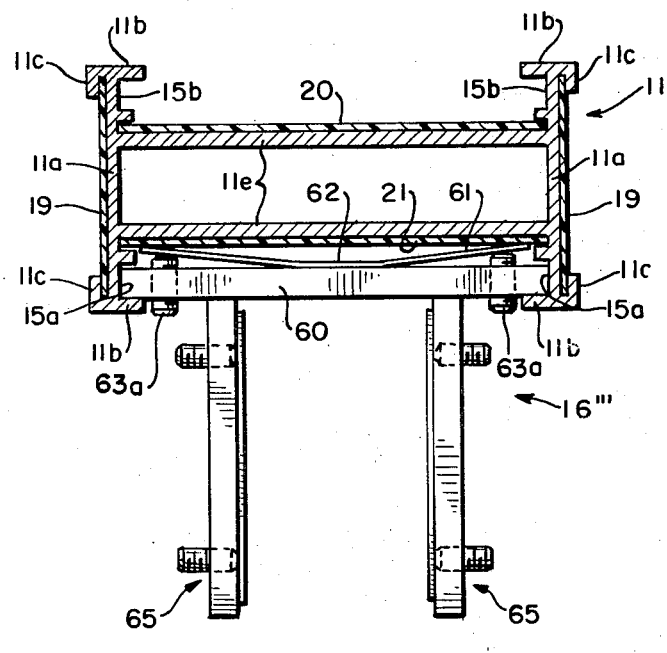
FIG. 18 is a view showing in combination the connector of FIG. 17 and a structural supporting member.

FIGS. 17 and 18 illustrate another embodiment of connector according to the present invention. As shown in FIG. 17, a connector 16''' has a base plate 60 which is connected through the center to a second plate or pressure shim 61 by a spotweld 62. As shown in FIG. 18, the plates 60 and shim 61 are designed to be received within a vertical track 15a in an upright member 11 whose parts have numbered in accordance with the embodiment of FIGS. 1–6. The plate 60 threadably receives four screws with Allen wrench recesses 63a therein. When the screws 63 are turned inwardly, they force the pressure shim 61 against formica strip 21 which is backed up by transverse web 11e of the upright member 11, thus causing the connector 16''' to be clamped in position. The connector 16''' includes support legs 65 having the same construction as plate 60 and shim 61, the legs 65 being adapted to be received in tracks provided in a horizontal structural support member 14.

Figure 19:
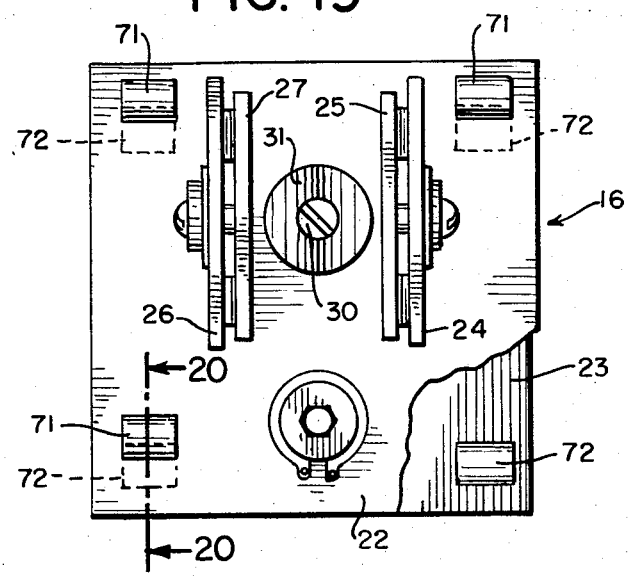
FIGS. 19 and 20 are plan and partial cross sectional views respectively of an alternate embodiment of the invention.
Figure 20:
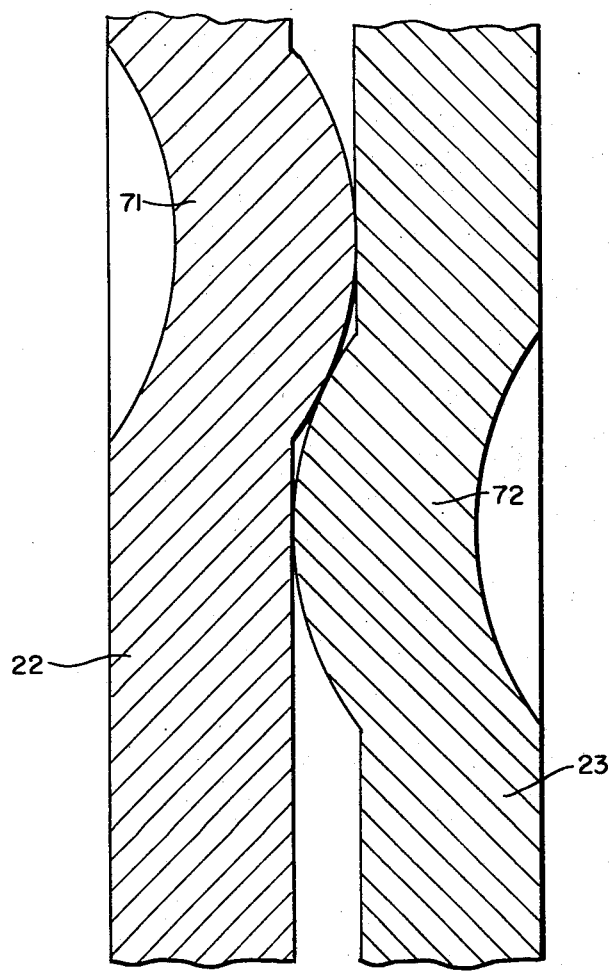

FIGS. 19 and 20 are illustrative of an alternate means for causing paired connector plates to be separated to provide a locking action. In the embodiment of FIGS. 19 and 20, the structure may be basically the same as that of FIGS. 3 and 4, and consequently, the same reference numerals have been indicated for similar parts. However, instead of having balls 28 captured in the grooves 22a, 23a, as shown in FIG. 19 a plurality of paired protuberances 70, 71 are formed projecting from the facing surfaces of plates 22 and 23. The protuberances are located as shown in FIG. 20 in close juxtaposition and are in effect adjacent ramp-like surfaces which will ride upon each other when the plates are moved in the direction of the arrows. Such movement will operate to separate the plates 22 and 23 in the same manner and with the same result as heretofore described.

It will be understood that the foregoing description relates to particular embodiments of the invention and is, therefore, merely representative. In order to appreciate fully the scope of the invention, reference should be made to the appended claims.

I claim:

1. A system for joining two members comprising, a first member having opposing, uniformly spaced wall surfaces which define a receiving recess, a second member including a first pair of plates disposed in close, overlying relation, said plates being slidably receivable within said recess with at least a portion of the plates aligned with the wall surfaces of said recess, first means for moving said plates apart to cause said portions thereof to bear with sufficient frictional force against the opposing wall surfaces of said recess to prevent sliding of said plates in said recess and to secure the first and second members together; said second member including a second pair of overlying plates one of which is rigidly connected to one plate of said first pair and the other of which is movable apart from the one plate of the second pair; and second means for moving the second pair of plates apart independently of the movement of the plates of said first pair.

2. The system according to claim 1 wherein first member is elongated, said recess is a track extending lengthwise of said elongated member and said second member is slidable within said track to any position lengthwise thereof.

3. The system according to claim 1 wherein two elongated members each define a track therein for receiving said base and support legs for forming a rigid connection between said two elongated members.

4. A system for rigidly joining elongated members comprising, at least two such members interconnected at a joining angle, the first of said members having opposing, uniformly spaced wall surfaces which define at least one lengthwise internal track, the second of said members having opposing, uniformly spaced internal wall surfaces which define at least one track adjacent to each connecting end thereof, a connector for joining said members comprising a pair of base plates and at least one pair of support plates connected to said base plates at said joining angle, the pairs of said base and support plates each lying in close, parallel overlying relation, the pair of said base plates being slidably received within a track in said first member and being movable to any position along the length of said track, the pair of support plates being slidably received within the track adjacent to a connecting end of said second member, and first and second means for independently separating edge portions of the plates of each pair of base and support plates generally perpendicular to said parallel direction to cause said edge portions of each of the base and support plates to bear independently of each other with sufficient frictional force against the opposing adjacent wall surfaces of respective tracks of said member to prevent slidable movement of said plates in said tracks.

5. The system according to claim 4 wherein said elongated members each have center sections which are box-shaped in cross section, said members further including two rectangular oppositely facing flanges spaced from at least one transverse side of said center section and defining therebetween a lengthwise track.

6. The system according to claim 5 wherein flange means define narrow grooves both transversely and longitudinally of said center section, said grooves being adapted to receive thin strips of a decorative material such as formica.

7. The system according to claim 5 wherein one set of track defining flanges is provided on each transverse side of said center section.

8. The system according to claim 7 wherein said connector includes one pair of rectangular base plates and two pairs of rectangular support plates, said support plates being connected to said base plates at a joining angle perpendicular to said first member.

9. The system according to claim 5 wherein each of said pairs of base and support plates has a plurality of rounded protuberances projecting from the facing surfaces of each pair of plates, said protuberances of each pair of plates being arranged to come into contact and slide upon other of said protuberances during relative sliding movements of said plates in each pair, and means for moving said paired plates in a direction to cause said protuberances to ride upon each other thereby forcing said pairs of plates apart in a direction perpendicular to the direction of movement of said plates.

10. A system for rigidly joining elongated members comprising, at least two such members interconnected at a joining angle, the first of said members having opposing, uniformly spaced wall surfaces which define at least one lengthwise internal track, the second of said members having opposing, uniformly spaced internal wall surfaces which define at least one track adjacent to each connecting end thereof, a connector for joining said members comprising a pair of base plates and at least one pair of support plates connected to said base plates at said joining angle, the pairs of said base and support plates each lying in close, parallel overlying relation and each defining a plurality of parallel opposing grooves in their facing surfaces, each groove having shallow inclined ends connected to a deeper center; a rotary member fitted within each groove for longitudinal movement therein, each said rotary members being at all times in contact simultaneously with the opposing grooves in each facing surface, the pair of said base plates being slidably received within a track in said first member and being movable to any position along the length of said track, the pair of support plates being slidably received within the track adjacent to a connecting end of said second member, and means for separating edge portions of the plates of each pair of base and support plates generally perpendicular to said parallel direction to cause said edge portions to bear with sufficient frictional force against the adjacent wall surfaces of respective tracks of said member to prevent slidable movement of said plates in said tracks; said means including means for moving said overlying plates in the direction of said grooves to cause said rotary members to ride upon an inclined end of each groove thereby forcing said pairs of plates apart in a direction perpendicular to the direction of movement of said plates.

11. The system according to claim 10 wherein each said pair of plates is bonded to an intervening resilient strip, one of said plates has a flange in overlapping relation with respect to the edge of an adjacent plate, and a threaded screw in said flange one end of which bears upon said edge, so that when the screw is rotated against said edge, said plates are moved in the direction of said grooves.

12. The system according to claim 8 wherein each pair of plates comprises a rigid plate and a flexible plate, the flexible plate being secured to the rigid plate at the respective centers of each plate, a threaded hole through said rigid plate adjacent to the corners thereof, threaded screws received in said holes having ends bearing upon oppositely facing portions of said flexible plate, rotation of said screws causing portions of said flexible plate and of said rigid plate to bear against adjacent wall portions of said track.

13. A system according to claim 1 wherein the oppositely facing surfaces of the plates define the portions which are aligned with the wall surfaces of the recess.

14. A system for rigidly joining members comprising at least two such members interconnected at a joining angle, the first of said members having opposing, uniformly spaced wall surfaces which define at least one lengthwise internal track, the second of said members having opposing, uniformly spaced internal wall surfaces which define at least one track adjacent to each connecting end thereof, a connector for joining said members comprising a pair of base plates and at least one pair of support plates connected to said base plates at said joining angle, the pairs of said base and support plates each lying in close, overlying relation, the pair of said base plates being slidably received within a track in said first member with at least a portion of the plates aligned with the opposing wall surfaces of the recess and being movable along said track, the pair of support plates being slidably received within the track adjacent to a connecting end of said second member with at least a portion of these plates aligned with the opposing wall surfaces of the recess, said base and support plates defining the entire external shape of said connector and being disposed completely within said first and second members, respectively, and first and second means for independently separating the plates of each pair of base and support plates, respectively, from each other to cause the plates of each pair to bear independently of the plates of the other pair with sufficient frictional force against the opposing adjacent wall surfaces of the respective tracks of said members to prevent sliding movement of said plates in said tracks.

15. A system for rigidly joining elongated members comprising at least two such members interconnected at a joining angle, the first of said members having opposing, uniformly spaced wall surfaces which define at least one lengthwise internal track, the second of said members having opposing, uniformly spaced internal wall surfaces which define at least one track adjacent to each connecting end thereof, a connector for joining said members comprising a pair of base plates and at least one pair of support plates connected to said base plates at said joining angle, the pairs of said base and support plates each lying in close, parallel overlying relation, the pair of said base plates being slidably received within a track in said first member and being movable to any position along the length of said track, the pair of support plates of the second of said members being received within the track adjacent to a connecting end of said member, and means for separating edge portions of the plates of each pair of base and support plates generally perpendicular to said parallel direction to cause said edge portions to bear with sufficient frictional force against the adjacent wall surfaces of respective tracks of said member to prevent slidable movement of said plates in said tracks; each of said pairs of base and support plates defining a plurality of parallel opposing grooves in their facing surfaces, each groove having shallow inclined ends connected to a deeper center, a rotary member fitted within each groove for longitudinal movement therein, each said rotary members being at all times in contact simultaneously with the opposing grooves in each facing surface, and means for moving said overlying plates in the direction of said grooves to cause said rotary members to ride upon an inclined end of each groove thereby forcing said pairs of plates apart in a direction perpendicular to the direction of movement of said plates, said means for moving the overlying plates including a shaft, a circular eccentric section having an axis parallel to the axis of said shaft and disposed at a predetermined eccentric distance from the axis of said shaft, an aperature in one of said plates for receiving one end of said shaft for concentric rotation therein, a hexagonal member rotatably receiving said circular eccentric section therein, a hexagonal opening in said second plate slidably receiving said hexagonal member for movement in the longitudinal direction, said hexagonal opening being elongated in a transverse direction to provide a clearance equal to at least said predetermined eccentric distance whereby rotation of said shaft and eccentric section will effect longitudinal movement of said plates without transverse movement of said plates.

* * * * *

PO-1050
(5/69)

UNITED STATES PATENT OFFICE
CERTIFICATE OF CORRECTION

Patent No. 3,811,575          Dated May 21, 1974

Inventor(s) Richard A. Boegehold

It is certified that error appears in the above-identified patent and that said Letters Patent are hereby corrected as shown below:

Column 1, line 17, "varried" should read --varied--.

Column 2, line 24, "cuase" should read --cause--;

line 44, "Embodiment" should read --Embodiments--.

Column 3, line 41, "longitudianl" should read --longitudinal--;

line 49, "on" should read --to--.

Claim 15, line 10, "being received" should read --being slidably received--.

Signed and sealed this 5th day of November 1974.

(SEAL)
Attest:

McCOY M. GIBSON JR.
Attesting Officer

C. MARSHALL DANN
Commissioner of Patents